(12) United States Patent
Wang et al.

(10) Patent No.: US 6,652,991 B1
(45) Date of Patent: Nov. 25, 2003

(54) DUCTILE NIAL INTERMETALLIC COMPOSITIONS

(75) Inventors: You Wang, Edmonton (CA); Weixing Chen, Edmonton (CA)

(73) Assignee: The Governors of the University of Alberta, Alberta (CA)

( * ) Notice: Subject to any disclaimer, the term of this patent is extended or adjusted under 35 U.S.C. 154(b) by 0 days.

(21) Appl. No.: 10/267,261

(22) Filed: Oct. 9, 2002

(51) Int. Cl.[7] .................. B32B 15/01; B32B 31/00; C22C 38/18; C22C 19/03
(52) U.S. Cl. ............... 428/653; 148/327; 148/331; 148/333; 148/336; 148/428; 148/429; 148/442; 420/40; 420/43; 420/77; 420/79; 420/80; 420/83; 420/94; 420/97; 420/104; 420/112; 420/119; 420/443; 420/445; 420/452; 420/455; 420/459; 420/460; 420/580; 420/581; 420/583; 420/584.1; 420/588; 428/652; 428/678; 428/679; 428/680; 428/681; 428/682; 428/685; 428/926; 428/935; 428/937; 428/938; 428/940

(58) Field of Search .................. 428/653, 652, 428/678, 679, 680, 681, 682, 685, 926, 935, 937, 938, 940; 420/40, 43, 77, 79, 80, 83, 94, 97, 104, 112, 119, 443, 445, 452, 455, 459, 460, 580, 581, 583, 584.1, 588; 148/327, 331, 333, 336, 428, 429, 442

(56) References Cited

U.S. PATENT DOCUMENTS

| | | |
|---|---|---|
| 5,698,006 A | 12/1997 | Ishiyama ............... 75/244 |
| 5,756,096 A | 5/1998 | Newman et al. ........... 424/154 |
| 5,837,385 A | 11/1998 | Schaeffer et al. ......... 428/610 |

Primary Examiner—Robert R. Koehler
(74) Attorney, Agent, or Firm—Kenneth H. Johnson

(57) ABSTRACT

The addition of small amounts of $CeO_2$ and Cr to intermetallic compositions of NiAl and FeAl improves ductility, thermal stability, thermal shock resistance, and resistance to oxidation, sulphidization and carburization.

18 Claims, 1 Drawing Sheet

DUCTILE NIAL INTERMETALLIC COMPOSITIONS

FIELD OF THE INVENTION

The present invention relates to intermetallic compounds having improved physical properties and mechanical properties, particularly ductile properties at room temperatures. In one embodiment the invention relates to aluminide intermetallic compounds, preferably nickel aluminides, and iron aluminides containing one or more compounds selected from the group consisting of $CeO_2$ and Cr.

BACKGROUND OF THE INVENTION

Aluminides are intermetallic compounds of aluminum and one or nickel or iron. These intermetallic compounds have the potential for many high temperature application but are limited due to their poor ductile performance at room temperature where the compounds are brittle and prone to spalling if it is in the form of coatings.

U.S. Pat. No. 5,837,385 issued Nov. 17, 1998 to Schaeffer et al. assigned to General Electric Company teaches nickel aluminide having improved mechanical properties. The aluminide (a stoichometric mixture of Ni and Al) is doped with a nobel metal, elemental Cr, or a MCr alloy where M is nickel, cobalt and/or iron. Further the NiAl aluminide may contain oxygen active elements such as yttrium, hafnium, cerium, zicronium and others to promote adherence of the aluminum oxide layer. The disclosure teaches that the oxygen active element may be present in an amount up to 1 atomic %. The patent teaches the use of the element rather than the oxide as required in the present invention. Further, the patent teaches that the intermetallic is formed by a diffusion process and is not formed by a coating process.

U.S. Pat. Nos. 5,756,096 and 5,698,006 issued Jun. 9, 1998 and Dec. 16, 1997, respectively, in the name of Ishiyama, assigned to Japan Atomic Energy Research Institute teach intermetallic nickel aluminides which may be doped with up to 1 weight % of Cr. The intermetallic compounds have improved high temperature strength and satisfactory oxidation resistance. The patent does not teach the presence of $CeO_2$.

The abstract of CN 1,306,097 published Jan. 8, 2001 in the name of Li Haoqin assigned to University of Qinghua teaches the addition of one or more of $TiO_2$, $CeO_2$, and aluminum phosphate to a monohydrargillite powder to an aluminum based ceramic coating. The abstract does not suggest the presence of Ni or Fe in the composition The present invention seeks to provide an intermetallic aluminide composition having good resistance to oxidation, sulphidization, and carburization and has improved ductile properties at room temperatures, chemical stabilities at elevated temperature, and resistance to high temperature thermal shock.

SUMMARY OF THE INVENTION

The present invention seeks to provide an intermetallic composition comprising
(i) from 37.5 to 49.4 atomic % of Al,
(ii) from 37.5 to 49.4 atomic % of one or more compounds selected from the group consisting of iron and nickel;
(iii) from 0 to 10, preferably from 2 to 8, most preferably 4 to 7 atomic % of Cr;
(iv) from 0.2 to 5, preferably 0.4 to 3, most preferably 0.5 to 2 atomic % of Ce,
(v) from 0 to 10, preferably from 0.8 to 6, most preferably from 1.0 to 4, atomic % of O.

The present invention further seeks to provide a coating composition having the above composition.

In a further embodiment the present invention seeks to provide a metallic substrate, preferably steel, desirably carbon steel, stainless steel, heat resistant steel, and nickel based alloys coated with the above intermetallic composition.

In a further embodiment the present invention seeks to provide a method of increasing the resistance of a metallic substrate, preferably steel, desirably stainless steel to one or more of oxidation, sulphidization and carburization by applying a coating having the above composition.

DETAILED DESCRIPTION

Figure 1:
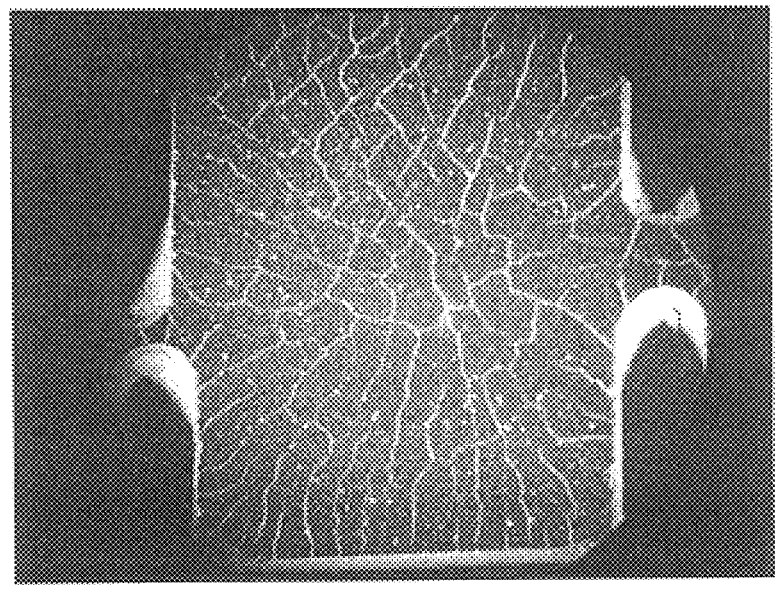
FIG. 1 is a photograph of a sample of stainless steel coated with iron aluminide and subjected to 10 heating cycles up to 1000° C.

Aluminides are mixtures of aluminum with other elements typically nickel or iron. The mixtures may be prepared by mixing pure or essentially pure (e.g. 99% purity) metal powders of aluminum and nickel or iron. Typically the aluminides comprise about 50 typically about 40–50 atomic to of aluminum, and about 50, typically about 50 to 40 atomic % of an element selected from the group consisting of nickel and iron.

In accordance with the present invention the aluminide composition may be doped with a combination of various elements and/or compounds. Typically the aluminide is doped with small amounts, of a Ce compound preferably $CeO_2$ and elemental (or metallic) Cr. The intermetallic composition may also contain small amounts of Mn, typically from about 0 to 0.5, preferably from about 0 to 0.3 atomic Chromium may be used in the compositions of the present invention in amounts from 0 to 10, preferably from 2 to 8, most preferably 4o to 7 atomic %

Cerium may be used in the compositions of the present invention in amounts from 0.2 to 5, preferably 0.4 to 3, most preferably 0.5 to 2 atomic %. Typically the cerium compound is $CeO_2$ and the corresponding amounts of oxygen may be from 0.8 to 6, most preferably from 1.0 to 4, atomic % of O. If the Ce is not present there is no oxygen. Possibly one could use pure Ce in which case the oxygen content would be 0 atomic %

In a further embodiment a combination of Cr and $CeO_2$ are present in the composition in a ratio to provide from 2 to about 8 atomic % of Cr and from 0.5 to 2.5, preferably 1 to 2, atomic % of Ce.

In one embodiment the intermetallic compositions of the present invention may comprise.
(i) from 43.75 to 48.25 atomic % of Al,
(ii) from 43.75 to 48.25 atomic % of one or more compounds selected from the group consisting of iron and nickel;
(iii) from 2 to 8 atomic % of Cr;
(iv) from 0.5 to 1.5 atomic % of Ce;
(iv) from 1 to 3 atomic % of O.

The composition may further optionally comprise from 0 to 0.3 atomic % of Mn.

The compositions of the present invention may be in powder form or in the form of an alloy. In powder form the compositions may be prepared by mixing relatively pure (98% and above) elements and compounds (i.e. preferably all elements except for $CeO_2$). The powder may be used per se as a coating composition in conventional coating processes including detonation gun spraying, cement packing, hard facing, laser cladding, plasma spraying, (e.g. low pressure plasma spraying), physical vapour deposition methods (PVD including cathodic arc sputtering, DC, RF, magnetron), flame spraying (e.g. high pressure/high velocity Oxygen Fuel (HP/HVOF), electron beam evaporation, and electrochemical methods. Combinations of these methods may also be used. Typically a powder having the intermetallic composition is applied to the substrate. The coating is also subjected to a heating/sintering process (which may be concurrent with the deposition process) at temperatures to result in the formation of a layer or alloy of the intermetallic composition. In some instances there may be diffusion of elements from the substrate into the intermetallic alloy. The costing should have a thickness from about 10 to 300 microns, preferably from 50 to 300 microns, most preferably from 50 to 250, microns desirably from about 80 to 200 microns.

The substrate may be any metal to which the intermetallic compound will bond. The substrate may be a carbon steel or a stainless steel, which may be selected from the group consisting of wrought stainless, austentic stainless steel and HP, HT, HU, HW and HX stainless steel, heat resistant steel, and nickel based alloys. The substrate may be a high strength low alloy steel (HSLA); high strength structural steel or ultra high strength steel. The classification and composition of such steels are known to those skilled in the art.

The intermetallic compound may also be formed into an alloy. The powder may be consolidated using conventional techniques such as extrusion (either hot or cold with or without the use of a binder such as a polymeric binder (e.g. polyethylene) such as slip casting), forging, powder consolidation including hot isostatic pressing (HIP), consolidation at atmospheric pressure (CAP or cold isotatic pressing), sintering to form a green part, powder consolidation and molding. The temperature ranges for these processes are similar to those outlined above for coatings and the pressures may range from atmospheric to about 103 MPA (15,000 psi) for HIP or up to about 414 MPA (60,000 psi) for cold isostatic pressing.

The intermetallic compositions of the present invention may be applied to a substrate or used directly (in a formed alloy part) in conditions which give rise to one or more of oxidation, carburization or sulphidization. If a surface coating is used it is applied to the surface exposed to the environment giving rise to the condition, for example in chemical processing plants and the like.

The intermetallic surfaces of the present invention additionally have improved adherence to the substrate, improved hardness, improved Young's modulus and improved η ratio (the ratio of recoverable deformation energy to the total deformation energy.

In some cases it may be desirable to add a primer or transition layer to the substrate prior to application of the intermetallic aluminide. This layer will be intermediate or in between the substrate and the aluminide layer. One suitable transition layer is a different intermetallic of the formulation NiCrAlY. This compound may be applied using similar methods as those used to apply the aluminide. The intermediate layer may have a thickness from 10 to 100 microns, preferably from 30 to 60 microns. The intermediate layer provides improved bonding at high temperatures typically up to 1200° C. The transition layer does not appear as desirable when the iron aluminide is coated on to carbon or stainless steel.

The present invention will now be illustrated by the following non-limiting examples in which unless otherwise indicated % means atomic %.

SAMPLE PREPARATION

Example 1

Nickel Aluminides

The base sample was a NiAl intermetallic powder. (NI50Al). To the base powder were added small amounts of Cr (to provide up to about 5 atomic % of Cr This is referred to as PCRA. The base NiAl intermetallic was doped with a small amount of $CeO_2$ to provide about 1.70 atomic % of Ce. This is sample PCEA. The base NiAl intermetallic was doped with small amounts of $CeO_2$ and Cr to provide about 1.5 atomic % of Ce and about 5.8 atomic % of Cr. This is sample PCECR.

The intermetallic compounds were applied to a sample of HP heat resistant steel coupons using a JP -5000™ HP/HVOF system manufactured by TAFA. The coupons were grit blasted prior to application of the thermal spray. For comparison purposes NiCrAlY powders were sprayed as a bond coating on some of the coupons prior to application of the NA Al intermetallic base composition.

The conditions for the HVOF thermal spraying were

Oxygen flow rate about 1900 standard cubic feet per hour;

Fuel (kerosene) 3 gallons per hour; and

Intermetallic compound powder feed rate 5 kg per hour. The nozzle was 15 inches from the substrate.

Microindentation Testing

The resulting coupons were analyzed for the thickness of the coating, hardness, young's modulus and η ratio based on the load and unloaded displacement curves from micro indentation studies. The micro indentation test was conducted using a Hysitron Co. indentation tester having a probe with a Berkovich™ diamond tip. The equipment included software to analyze for hardness, Young's elastic modulus and load displacement. The samples were tested at a loading time of 15 seconds and a maximum load of 300 μN. The results are set forth in table 1.

TABLE 1

| Code | Coating thickness (μm) | Hardness (HV $_{300\ mN}$) | Young's Modulus (GPa) | η ratio (%) |
|---|---|---|---|---|
| Base NiAl Compound | 5~30 | 442 | 150 | 27 |
| PCRA | 50~80 | 557 | 184 | 28 |
| PCEA | 80~150 | 556 | 191 | 32 |
| PCECR | 180~220 | 604 | 191 | 31 |

The variance in coating thickness may be attributed to the improved wetness and bond strength of the intermetallic compound containing Cr, Ce or both. Coating of the base NiAl intermetallic compound tended to spall during the rapid heating cooling cycle of the thermal spraying. While the Cr improves the resistance to spalling a significant increase is seen with $CeO_2$ alone or in combination with Cr.

With respect to hardness, the best results are with the coating doped with both $CeO_2$ and Cr. The addition of $CeO_2$ alone or Cr alone gives about the same hardness both better than the base intermetallic.

With respect to Young's modulus, the addition of $CeO_2$ alone or in combination with Cr, gives the best results. The same trend occurs with respect to η. Clearly the addition of $CeO_2$ significantly improves the properties of the base coating.

Erosion Testing

Portions of the samples were subjected to a coating erosion study. Samples of coated coupons were subjected to abrasive erosion testing at room temperature using a blast nozzle type erosion tester having the nozzle 60 mm from the sample. The carrier gas was air, the pressure drop across the nozzle was 300 kPa, the feed rate for the abrasive was 80 g/min and the angle of attack was 90°. The grit was the erosion particles of the AFS 50/70 test sand supplied by Silica Co. The erosion rate in grams eroded per gram of abrasive were about 15 for the base NiAl composition, about 10 for the composition doped with only Cr, about 3 for the composition doped only with $CeO_2$ and the composition doped with both $CeO_2$ and Cr. Further the surfaces were examined using SEM. The surface formed from the base alloy showed cracking and chipping at the surface representative of brittle failure mechanism. For the samples containing $CeO_2$ the surface showed signs of plugging or cutting representative of ductile erosion. The addition of $CeO_2$ to the base intermetallic composition improves the ductility of the material.

Carburization Testing

Samples of HP steel and the coated HP steel substrate having a surface area of 400–600 mm² were mechanically abraded on all surfaces to 600 grit finish and ultrasonically cleaned in ethanol immediately prior to testing. The carburization was conducted at 1100° C. (±1° C.) for 100 hours in a gas mixture containing 2.0% $Ch_4$ and the balance $H_2$. For the HP steel the depth of carburization was about 1.42 mm. For the sample coated with the base NiAl intermetallic compound, the depth of carburization was about 0.28 mm. For the remaining samples there was no appreciable carburization. As between samples coated with the base NiAl intermetallic composition, samples without a bond coating (as noted above) tended to begin to de laminate at the end of the test while those with the bond coat did not delaminate.

Microindentation Testing of the Carburized Samples

The carburized samples were subjected to microindentation testing as described above. The hardness and elastic modulus of all coating were decreased likely due to annealing. However, the effects were less in the compositions containing both Cr and $CeO_2$. Similar results were obtained for η.

While the incorporation of Cr per se improves the properties of coating and alloys of intermetallic compounds of NiAl, the addition of $CeO_2$ improves ductility and a number of other properties.

Example 2

Iron Aluminides

The base sample was a FeAl intermetallic powder ($Fe_{50}Al$). To the base powder were added small amounts of $CeO_2$ to provide about 2, 5 and 8 weight % of Ce (0.49, 1.22, and 1.97 atomic % of Ce respectively).

The intermetallic compounds were applied to a sample of HP heat resistant steel coupons using a JP -5000™ HP/HVOF system manufactured by TAFA, as described above.

The coated sample was subjected to the erosion test described above. The results of the erosion testing are set out in table 2.

TABLE 2

| Sample | Erosion Rate g/g × $10^6$ |
|---|---|
| Iron aluminide | 16 |
| Iron aluminide and 2 weight % of $CeO_2$ | 6 |
| Iron aluminide and 5 weight % of $CeO_2$ | 9.5 |
| Iron aluminide and 8 weight % of $CeO_2$ | 15 |

Figure 2:
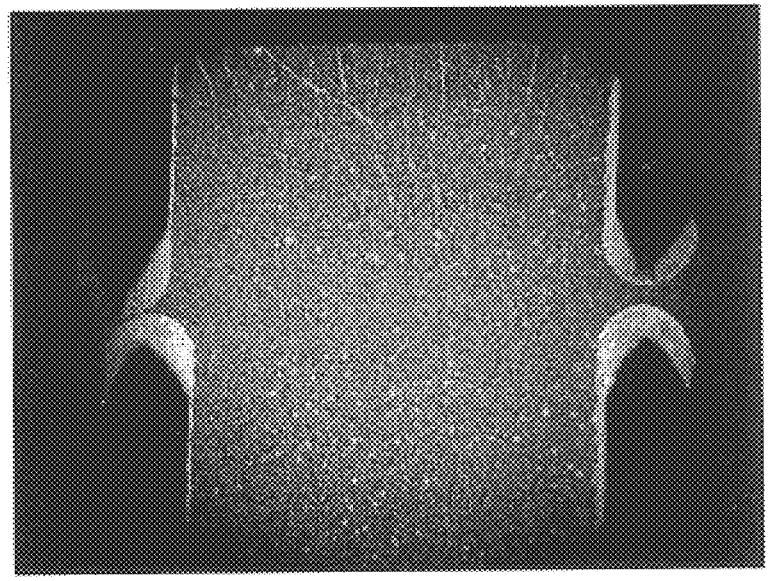
FIG. 2 is a photograph of a sample of stainless steel coated with iron aluminide containing 5 weight % $CeO_2$ and subjected to 10 heating cycles up to 1000° C.

The results show the addition of small amounts of $CeO_2$ improve the erosion resistance of iron aluminides Thermal Shock Sample of stainless steel coated to the same thickness with iron aluminide and iron aluminide and 5 weight % of $CeO_2$ were subjected to 10 cycles of heating to a peak temperature of 1,000° C. The coating containing $CeO_2$ showed little thermal shock while the sample without the $CeO_2$ showed severe cracking. FIGS. 1 and 2 are photographs of the samples after the thermal shock testing. FIG. 1 is the iron aluminide coated sample and FIG. 2 is the sample coated with iron aluminide doped with $CeO_2$.

What is claimed is:

1. An intermetallic composition comprising;
   (i) from 37.5 to 49.4 atomic % of Al,
   (ii) from 37.5 to 49.4 atomic % of one or more compounds selected from the group consisting of iron and nickel;
   (iii) from 0 to 10, atomic % of Cr;
   (iv) from 0.2 to 5, atomic % of Ce,
   (v) from 0 to 10 atomic % of O.

2. The intermetallic compound of claim 1, wherein Cr is present in an amount from 2 to 8 atomic %.

3. The intermetallic compound according to claim 2, wherein Ce is present in an amount from 0.4 to 3 atomic %.

4. The intermetallic compound according to claim 3, wherein 0 is present in an amount from 0.8 to 6 atomic %.

5. The intermetallic compound according to claim 4, wherein components (iv) and (v) are $CeO_2$.

6. The intermetallic composition according to claim 5, wherein component (ii) is Ni.

7. The intermetallic composition according to claim 1, wherein component (ii) is Fe.

8. An intermetallic composition, according to claim 1, comprising
   (i) from 43.75 to 48.25 atomic %, of Al,
   (ii) from 43.75 to 48.25 atomic % of one or more compounds selected from the group consisting of iron and nickel;
   (iii) from 2 to 8 atomic % of Cr;
   (iv) from 0.5 to 1.5 atomic % of Ce;
   (iv) from 1 to 3 atomic % of O.

9. An intermetallic alloy composition according to claim 1.

10. An intermetallic coating composition according to claim 1.

11. A steel substrate coated with a coating from 10 to 300 microns of the intermetallic composition according to claim 1.

12. The steel substrate according to claim 11, wherein the substrate is selected from the group consisting of carbon steel, stainless steel, heat resistant steel, HP, HT, HU, HW and HX stainless steel, and nickel based alloys.

13. The steel substrate according to claim 12, wherein the coating is from 50 to 250 microns thick.

14. The steel substrate according to claim 13, further comprising a layer of NiCrAlY between said substrate and said aluminide said layer having a thickness from 10 to 100 microns.

15. A steel substrate according to claim 13, wherein the substrate is HP steel.

16. A method for reducing the effects of carburization on carbon steels, stainless steels, heat resistant steels and nickel based alloys comprising coating the surface exposed to the environment causing carburization with an intermetallic compound according to claim 1.

17. A method for reducing the effects of sulphidization on carbon steels, stainless steels, heat resistant steels and nickel based alloys comprising coating the surface exposed to the environment causing sulphidization with an intermetallic compound according to claim 1.

18. A method for reducing the effects of oxidization on carbon steels, stainless steels, heat resistant steels and nickel based alloys comprising coating the surface exposed to the environment causing oxidization with an intermetallic compound according to claim 1.

* * * * *